United States Patent
Sun et al.

(10) Patent No.: US 9,055,436 B2
(45) Date of Patent: Jun. 9, 2015

(54) TRANSMITTING DEVICE, RECEIVING DEVICE, WIRELESS COMMUNICATION SYSTEM AND METHOD FOR CONTROLLING WIRELESS COMMUNICATION SYSTEM

(71) Applicants: Yan Sun, Beijing (CN); Wei Wang, Beijing (CN); Haihua Yu, Beijing (CN); Bin Da, Beijing (CN)

(72) Inventors: Yan Sun, Beijing (CN); Wei Wang, Beijing (CN); Haihua Yu, Beijing (CN); Bin Da, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 61 days.

(21) Appl. No.: 13/874,671

(22) Filed: May 1, 2013

(65) Prior Publication Data
US 2013/0336484 A1  Dec. 19, 2013

(30) Foreign Application Priority Data
Jun. 13, 2012 (CN) .......................... 2012 1 0195084

(51) Int. Cl.
*H04W 12/04* (2009.01)
*H04B 10/114* (2013.01)

(52) U.S. Cl.
CPC ............ *H04W 12/04* (2013.01); *H04B 10/1149* (2013.01)

(58) Field of Classification Search
CPC .................................. H04W 12/04; H04L 9/12
See application file for complete search history.

(56) References Cited

U.S. PATENT DOCUMENTS

| 7,116,661 | B2 | 10/2006 | Patton | |
|---|---|---|---|---|
| 7,251,457 | B1 * | 7/2007 | Davi | 455/67.13 |
| 7,961,886 | B2 * | 6/2011 | Tiwari | 380/277 |
| 2005/0276418 | A1 * | 12/2005 | Hagiwara | 380/270 |
| 2007/0036353 | A1 * | 2/2007 | Reznik et al. | 380/30 |
| 2010/0020964 | A1 * | 1/2010 | Horie | 380/44 |
| 2011/0138173 | A1 * | 6/2011 | Okuda | 713/161 |

FOREIGN PATENT DOCUMENTS

| JP | 2006238343 A | * | 9/2006 |
|---|---|---|---|
| JP | 2013-021499 | | 1/2013 |
| WO | WO 2013/008939 A1 | | 1/2013 |

OTHER PUBLICATIONS

Okuda, K.; Murata, M.; Nakamura, T.; Uemura, W.; Yamamoto, T., "Proposal and development of encryption key distribution system using visible light communication," Consumer Electronics-Berlin (ICCE-Berlin), 2011 IEEE International Conference on, vol., No., pp. 71,73, Sep. 6-8, 2011.*

* cited by examiner

*Primary Examiner* — Gilberto Barron, Jr.
*Assistant Examiner* — Alexander Lapian
(74) *Attorney, Agent, or Firm* — Oblon, McClelland, Maier & Neustadt, L.L.P.

(57) ABSTRACT

A transmitting device, a receiving device, a wireless communication system and a method for controlling the wireless communication system are used for creating a secure wireless communication network of a limited area. The transmitting device comprises: one or more transmitters configured to transmit wireless signals, and create the limited area by a coverage scope of the wireless signals; a cryptography key generating unit configured to generate a cryptography key for the wireless signals; a cryptography key encoding unit configured to encode the cryptography key to a cryptography key frame; and a cryptography key scheduling unit configured to schedule the cryptography key frame so as to control the transmitter to transmit the wireless signals including the cryptography key frame.

13 Claims, 6 Drawing Sheets

FIG.3B $I_F$ – Forward Current (mA)

| HEADER | TRANSMITTER ID | FRAME SEQUENCE NUMBER | TIME STAMP | USER DESIGN | RECEIVED INFORMATION | KEY | SELF-CHECK CODE |

FIG.6

TRANSMITTING DEVICE, RECEIVING DEVICE, WIRELESS COMMUNICATION SYSTEM AND METHOD FOR CONTROLLING WIRELESS COMMUNICATION SYSTEM

BACKGROUND OF THE INVENTION

1. Field of the Invention

The present invention generally relates to the communication field, and specifically, a transmitting device, a receiving device, a wireless communication system and a method for controlling the wireless communication system that are used to realize a secure wireless communication network in a limited area.

2. Description of the Related Art

With the rapid development of network technology, wireless communication networks are created almost everywhere. The wireless communication network can cover a certain scope, and communication devices are used within the scope.

For convenience of a user, the wireless communication network usually has high connectibility; however, it may highlight the security menace of the wireless network. Specifically, high security is required, in cases where the wireless communication network is created in an enterprise or a home.

Moreover, there usually is no obvious boundary in a coverage area of the wireless communication network, the coverage area is largely based on the infrastructure such as the power of wireless transmitters.

In a wireless communication network of the prior art, a system of a RFSD (Radio Frequency Security Device) can be provided for security of the periphery specified by a WLAN (Wireless Local Area Network). The RFSD system can create a secure area in the coverage scope of the wireless communication network, so as to limit the WLAN of physical separation and its network traffic. The RFSD system ensures the connection with the wireless device having a unique authorization of the secure area by eliminating the data and intercepting of the radio waves, so as to realize the security of the wireless periphery.

However, the operating principle of the RFSD system is complicated, therefore the RFSD has a complicated structure, and high cost and will cause a lot of inconvenience.

Therefore, it is necessary to realize a high speed, secure, quick and convenient wireless communication network of a limited area.

SUMMARY OF THE INVENTION

The present invention is made in light of the above problems and requirements of the prior art.

The embodiments of the present invention have an object to provide a transmitting device, a receiving device, a wireless communication system and a method for controlling the wireless communication system for realizing a secure wireless communication network of a limited area.

According to an aspect of the embodiment of the present invention, a transmitting device for creating a secure wireless communication network of a limited area comprises: one or more transmitters configured to transmit wireless signals, and create the limited area by a coverage scope of the wireless signals; a cryptography key generating unit configured to generate a cryptography key for the wireless signals; a cryptography key encoding unit configured to encode the cryptography key to a cryptography key frame; and a cryptography key scheduling unit configured to schedule the cryptography key frame so as to control the transmitter to transmit the wireless signals including the cryptography key frame.

In the transmitting device, the wireless signals are infrared signals.

In the transmitting device, a coverage scope of an infrared transmitter is limited according to the following equation 1:

$$P_R = \sigma \times \rho_{D_{(d)}} \times \sum_N P_{T_{(I)}} \rho_{Tr_{(\alpha_{Tr})}} \qquad \text{equation 1}$$

where $\rho_{D_{(d)}}$ an attenuation coefficient of a distance, d is a distance to the transmitter, $$\rho_{Tr_{(\alpha_{Tr})}}$$

is an attenuation coefficient of a transmitting angle (against a centerline) of the transmitter, $\alpha_{Tr}$ is the transmitting angle (against the centerline) of the transmitter, $P_{T_{(I)}}$ is a relationship map between a transmitting power of one LED and the current, N is the number of infrared LEDs, $P_R$ is an actual receiving power of an infrared receiver at one node, and $\sigma$ is another parameter, wherein a node is within the coverage scope of the wireless communication network, in cases where the receiving power $P_R$ of the node is greater than a threshold power.

In the transmitting device, the coverage scope of two or more infrared transmitters is limited according to transmitting angles of each infrared transmitter ($\alpha$), transmitting distances of each infrared transmitter (d), transmitting powers of each infrared transmitter (I,Pt,Pr$_0$) and positions and orientations of each infrared transmitter (x,y, $\vec{\gamma}$).

In the transmitting device, the cryptography key generating unit is configured to generate the cryptography key according to a real random noise.

In the transmitting device, the cryptography key generating unit is configured to generate the cryptography key in real-time.

In the transmitting device, the cryptography key frame having a frame structure composed of a header, a transmitter ID, a frame sequence number, a time stamp, a user design, a received information, a key and a self-check code.

According to another aspect of the embodiment of the present invention, a receiving device for receiving the wireless signals transmitted by the transmitting device, so as to access the wireless communication network created by the wireless signals comprise: a receiver configured to receive the wireless signals; a cryptography key decoding unit configured to decode the cryptography key frame of the wireless signals so as to obtain the cryptography key; a sequence adjustment and synchronization unit configured to adjust a sequence of the obtained plural cryptography keys so as to synchronize the plural cryptography keys; an area cryptography key generating unit configured to generate an area cryptography key according to the synchronized plural cryptography keys; and a network access unit configured to access the wireless communication network based on the area cryptography key.

According to another aspect of the embodiment of the present invention, a wireless communication system for creating a secure wireless communication network of a limited area, comprises: a transmitting device for creating the secure wireless communication network of the limited area, wherein the transmitting device comprises one or more transmitters configured to transmit wireless signals, and creates the limited area by a coverage scope of the wireless signals; a cryptography key generating unit configured to generate a cryptography key for the wireless signals; a cryptography key encoding unit configured to encode the cryptography key to a cryptography key frame; and a cryptography key scheduling unit configured to schedule the cryptography key frame so as to control the transmitter to transmit the wireless signals including the cryptography key frame, and a receiving device for receiving the wireless signals transmitted by the transmitting device, so as to access the wireless communication network created by the wireless signals, wherein the receiving device comprises a receiver configured to receive the wireless signals; a cryptography key decoding unit configured to decode the cryptography key frame of the wireless signals so as to obtain the cryptography key; a sequence adjustment and synchronization unit configured to adjust a sequence of the obtained plural cryptography keys so as to synchronize the plural cryptography keys; an area cryptography key generating unit configured to generate an area cryptography key according to the synchronized plural cryptography keys; and a network access unit configured to access the wireless communication network based on the area cryptography key.

According to another aspect of the embodiment of the present invention, a method for controlling the wireless communication system for creating a secure wireless communication network of a limited area, comprises: a step of transmitting wireless signals, and creating the limited area by a coverage scope of the wireless signals; a step of generating a cryptography key for the wireless signals; a step of encoding the cryptography key to a cryptography key frame; a step of scheduling the cryptography key frame so as to control the transmitted wireless signals including the cryptography key frame; a step of receiving the wireless signals; a step of decoding the cryptography key frame of the wireless signals so as to obtain the cryptography key; a step of adjusting a sequence of the obtained plural cryptography keys so as to synchronize the plural cryptography keys; a step of generating an area cryptography key according to the synchronized plural cryptography keys; and a step of accessing the wireless communication network based on the area cryptography key.

According to the transmitting device, the receiving device, the wireless communication system and the method for controlling the wireless communication system according to the embodiment of the present invention, a high speed, secure, quick and convenient wireless communication network of a limited area can be realized by an easy configuration.

BRIEF DESCRIPTION OF THE DRAWINGS

In the following, embodiments of the present invention and technology solutions are described with reference to the accompanying drawings. It should be noted that the following drawings are just the embodiments of the present invention, other drawings may also be obtained according to the following drawings by those people skilled in the art without creative works.

DETAILED DESCRIPTION OF THE PREFERRED EMBODIMENTS

In the following, the transmitting device, the receiving device, the wireless communication system and the method for controlling the wireless communication system of the embodiment of the present invention are described with reference to the accompanying drawings.

Figure 1:
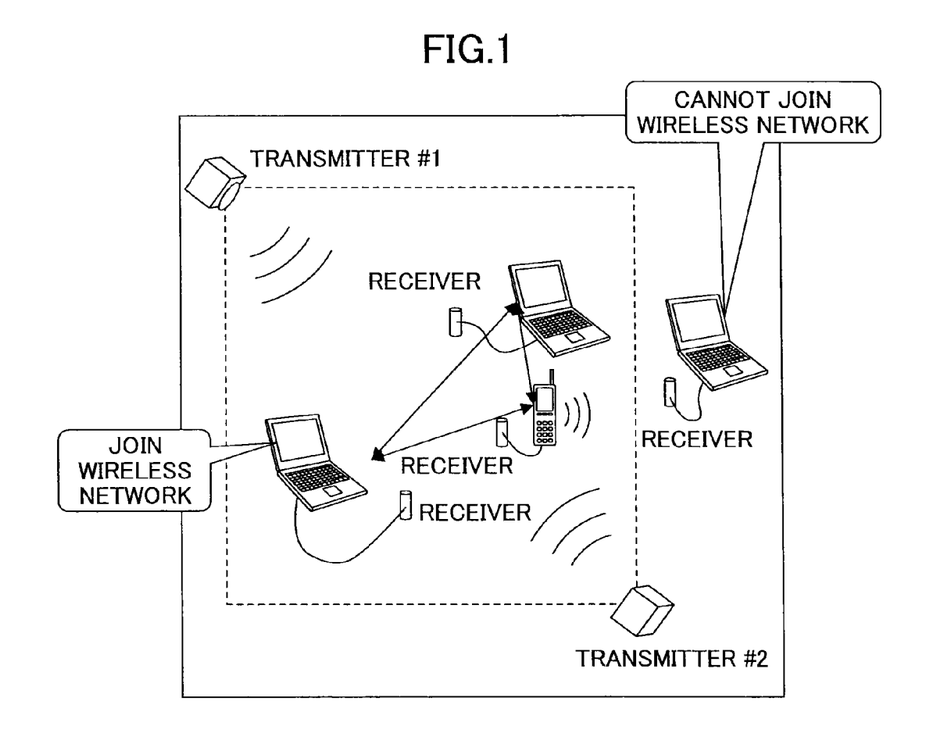
FIG. 1 is a schematic drawing illustrating the created wireless network of the limited area according to the embodiment of the present invention.

FIG. 1 is a schematic drawing illustrating the created wireless network of the limited area according to the embodiment of the present invention. As illustrated in FIG. 1, in the embodiment of the present invention, the wireless communication network of the limited area is created according to the coverage scope of the transmitting signals of the transmitter (emitter) #1 and transmitter (emitter) #2. In the communication network, only a receiver within the scope of the limited area can join the wireless network so as to communicate with other receivers in the area with each other; and a receiver out of the area cannot join the wireless network, so that it cannot communicate with the receivers in the limited area with each other.

The wireless communication network of the limited area is created by using the coverage scope of the transmitting signals of the transmitters. The solution of the embodiment of the present invention is to actually create a secure wireless communication network of the limited area on the physical layer.

According to the embodiment of the present invention, a transmitting device for creating a secure wireless communication network of a limited area is provided. The transmitting device comprises: one or more transmitters configured to transmit wireless signals, and create the limited area by a coverage scope of the wireless signals; a cryptography key generating unit configured to generate a cryptography key for the wireless signals; a cryptography key encoding unit configured to encode the cryptography key to a cryptography key frame; and a cryptography key scheduling unit configured to schedule the cryptography key frame so as to control the transmitter to transmit the wireless signals including the cryptography key frame.

Figure 2:
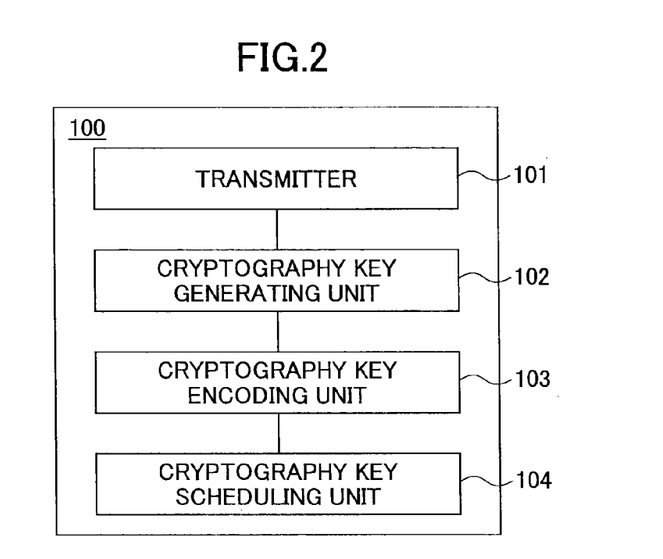
FIG. 2 is a block diagram illustrating the transmitting device of the embodiment of the present invention.

FIG. 2 is a block diagram illustrating the transmitting device of the embodiment of the present invention. As illustrated in FIG. 2, the transmitting device 100 for creating a secure wireless communication network of a limited area according to the embodiment of the present invention comprises: one or more transmitters 101 for transmitting wireless signals, and creating the limited area by a coverage scope of the wireless signals; a cryptography key generating unit 102 for generating a cryptography key for the wireless signals transmitted by the transmitter 101; a cryptography key encoding unit 103 for encoding the cryptography key generated by the cryptography key generating unit 102 to a cryptography key frame; and a cryptography key scheduling unit 104 for scheduling the cryptography key frame generated by the cryptography key encoding unit 103 so as to control the transmitter 101 to transmit the wireless signals including the cryptography key frame.

In the transmitting device according to the embodiment of the present invention, the wireless communication network of the limited area may be built by infrared transmitters (emitters), because infrared light has the following characteristics. First, human vision will not be affected by the built wireless communication network, because infrared light is an invisible light. Moreover, area boundary of the limited area can be controlled accurately by adjusting the transmitting angle of the infrared transmitter, because infrared light travels in straight lines. Additionally, the transmitting signals can be encoded because of the characteristics of luminescence; therefore, an infrared cryptography key may be embedded into (built-in) the transmitted infrared signals so as to improve the security of the created wireless communication network.

In the embodiment of the present invention, one infrared transmitter may be used, or two or more infrared transmitters may also be used, in cases where the wireless communication network of the limited area is created by using the infrared characteristics of the infrared transmitter.

As described above, the coverage scope of the wireless communication network depends largely on the power of the transmitter for transmitting the wireless signals. In the embodiment of the present invention, the area boundary of the area may be limited by the power of the infrared transmitter likewise, in cases where the wireless communication network of the limited area is built by one infrared transmitter.

Figure 3A:
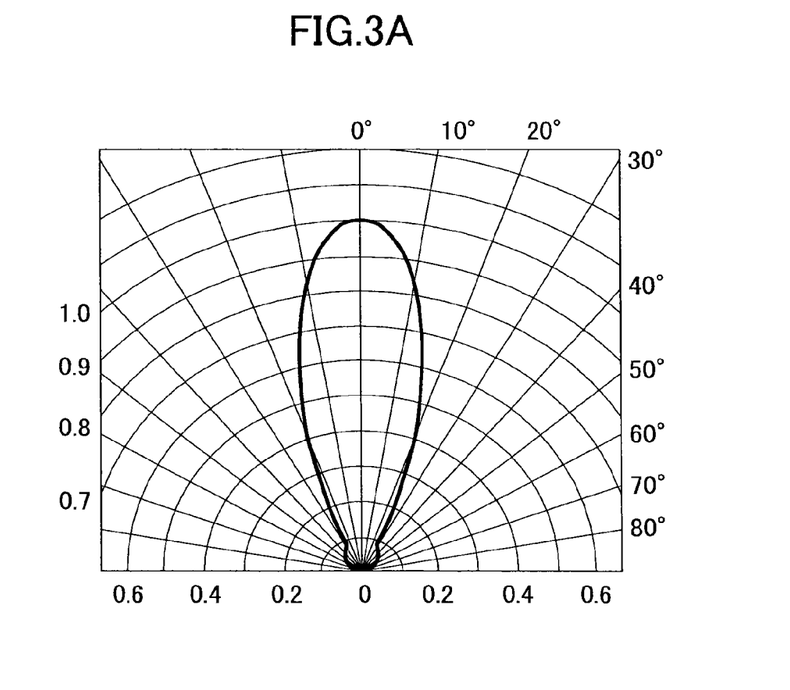
FIGS. 3A and 3B are schematic drawings illustrating relevant parameters of one infrared transmitter.
Figure 3B:
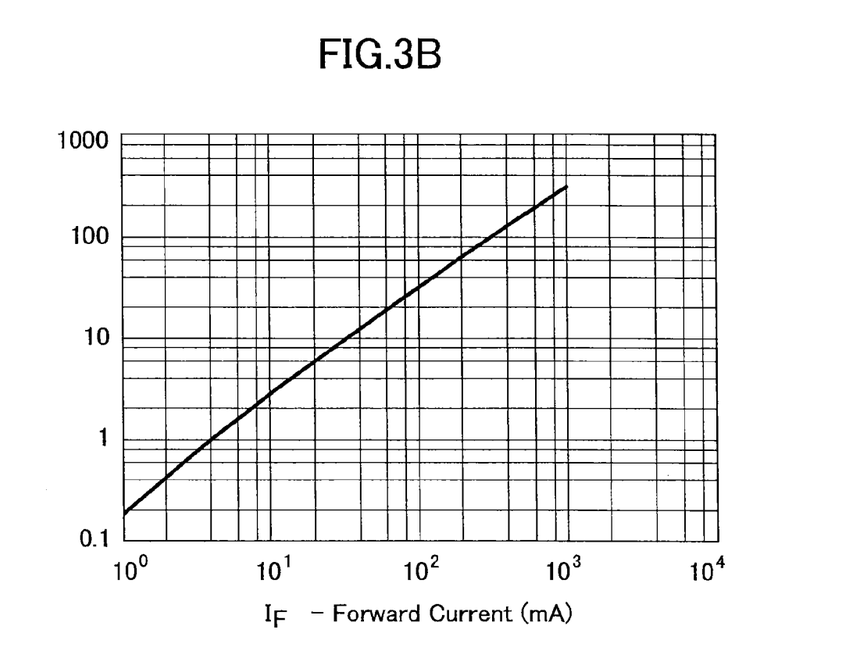

Specifically, a receiving power at a node within the coverage scope of the infrared signal may be calculated according to the following equation 1:

$$P_R = \sigma \times \rho_{D_{(d)}} \times \sum_N P_{T_{(I)}} \rho_{T_{r(\alpha_{Tr})}} \qquad \text{equation 1}$$

where $\rho_{D_{(d)}}$ an attenuation coefficient of a distance, d is a distance to the transmitter, as illustrated in FIG. 3A, $$\rho_{T_{r(\alpha_{Tr})}}$$

is an attenuation coefficient of a transmitting angle (against a centerline) of the transmitter, $\alpha_{Tr}$ is the transmitting angle (against the centerline) of the transmitter, as illustrated in FIG. 3B, $P_{T_{(I)}}$ is a relationship map between a transmitting power of one LED and the current. N is the number of infrared LEDs, $P_R$ is an actual receiving power of an infrared receiver at one node, and σ is another parameter. For example, σ may be an influence on the infrared transmission power from a transmission medium (such as air dust concentration or water vapor concentration). Moreover, σ may also be an error of a non-use LED unit itself with respect to its own transmission power.

It may be regarded that a node is within the coverage scope of the created wireless communication network, in cases where the receiving power $P_R$ of the node is greater than a threshold power $P_{R0}$ ($P_R > P_{R0}$). For example, in the embodiment of the present invention, the threshold power $P_{R0}$ may be set to 0.2 mW/m².

As described above, FIGS. 3A and 3B are schematic drawings illustrating relevant parameters of one infrared transmitter. Specifically, with respect to the infrared transmitter of a single LED, FIG. 3A is a schematic drawings illustrating the attenuation coefficient of the transmitting angle of the transmitter against a centerline, and FIG. 3B is a relationship map between the transmitting power of LED and the current.

In addition, in the embodiment of the present invention, the wireless communication network of the limited area may be created by two or more infrared transmitters. As an example using two infrared transmitters, during the scope of the created area is limited, first, the coverage scope of one infrared transmitter on the plane may be determined, the orientations (directions) of the two infrared transmitters is determined, and then, an overlap coverage area between the two infrared transmitters is determined. The created area specifically relates to the following parameters of the infrared transmitters: transmitting angles of the infrared transmitters (α), transmitting distances of the infrared transmitters (d), transmitting powers of the infrared transmitters (I,Pt,Pr₀) and positions and orientations of the infrared transmitters (x,y, $\vec{\gamma}$ ).

Figure 4A:
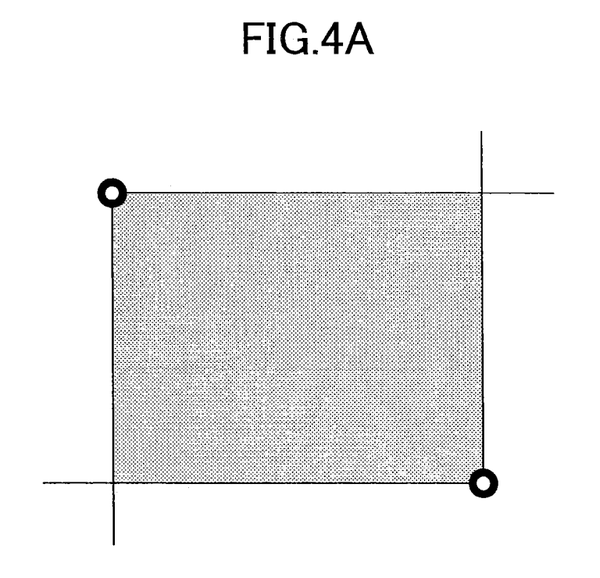
FIG. 4A-4D are schematic drawings illustrating an area limited by two or more infrared transmitter.
Figure 4B:
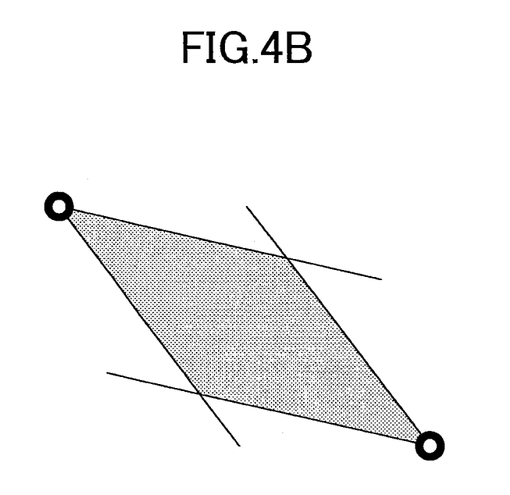
Figure 4C:
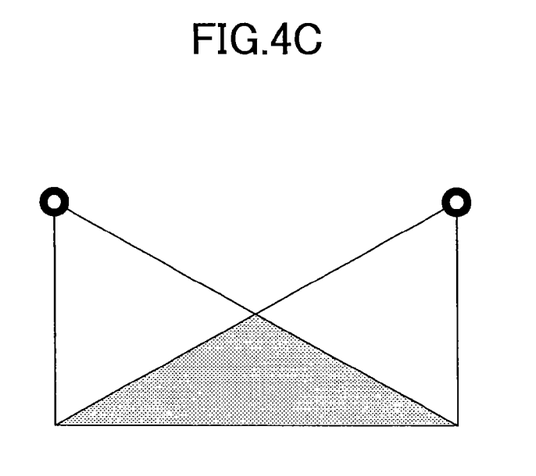
Figure 4D:
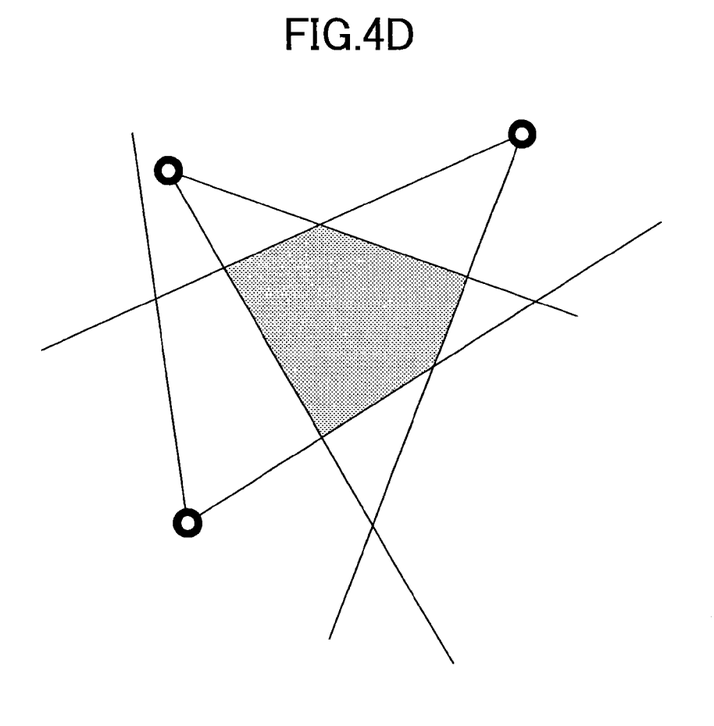

FIG. 4A-4D are schematic drawings illustrating area limited by two or more infrared transmitter. As illustrated in FIG. 4A, if two infrared transmitters are disposed to face each other and the transmitting angles of each infrared transmitter are adjusted to a right angle, the area limited by the transmitting signals of the two infrared transmitters is a rectangle as illustrated in the drawing. As illustrated in FIG. 4B, if two infrared transmitters are disposed to face each other and the transmitting angles of each infrared transmitter are changed, for example, the transmitting angles are changed to an angle less than degrees, the area limited by the transmitting signals of the two infrared transmitters is a quadrilateral as illustrated in the drawing. As illustrated in FIG. 4C, if two infrared transmitters are disposed in parallel and the infrared signals are emitted in the same direction, a triangular area will be created as illustrated in the drawing. Here, the other one side of the triangular area as illustrated in FIG. 4C may be limited by an obstacle in the practical application scene such as a wall. As illustrated in FIG. 4D, if three infrared transmitters are used, a hexagonal area will be constructed as illustrated in the drawing. It should be noted that an arbitrary polygonal area may be constructed by selecting the number, disposing positions and transmitting angles of the infrared transmitters.

In the above FIG. 4A-4D, for convenience, the influence on the created area scope from transmission powers of each transmitter are not regarded. In fact, the transmission powers of the infrared transmitters and the size of the limited area may be selected appropriately, so as to make the transmission powers of the infrared transmitters be enough to cover the created area scope.

In cases where the power of the infrared transmitter is regarded, suppose there is one infrared transmitter in one coordinate system and its position is represented by $A_{(X_A,Y_A,\vec{\gamma}_A)}$, where $X_A, Y_A$ are the coordinate of the infrared transmitter and $\vec{\gamma}_A$ is a vector of the infrared transmitter with respect to the coordinate origin. The positions of other infrared transmitters is represented by $B_{0(X_0,Y_0,\vec{\gamma}_0)}$, $B_{1(X_1,Y_1,\vec{\gamma}_1)}$, etc., by the same way. In this way, the receiving power of the above infrared transmitter may be presented by the following equation 2 and equation 3.

$$P_{RA} = (P_R, x_A, y_A, \vec{\gamma}_A) \qquad \text{equation 2}$$

$$P_{RBn} = (P_R, x_n, y_n, \vec{\gamma}_n) \qquad \text{equation 3}$$

where, $$d = \vec{\gamma}_A \sqrt{|x-x_A|^2 + |y-y_A|^2} \qquad \text{equation 4}$$

If the above equation 1 of the receiving power is substituted in equations 2 and 3, the following equation 5 and equation 6 will be obtained.

$$P_{RA} = \sigma \times \rho_{D_{\left(\vec{\gamma}_A \sqrt{|x-x_A|^2+|y-y_A|^2}\right)}} \times \sum_N P_{T_{(I)}} \rho_{T_{r(\alpha_{Tr})}} \qquad \text{equation 5}$$

-continued $$P_{RBn} = \sigma \times \rho_{D_{\left(\gamma_n \sqrt{|x-x_n|^2+|y-y_n|^2}\right)}} \times \sum_N P_{T_{(I)}} \rho_{Tr_{(\alpha Tr)}} \quad \text{equation 6}$$

In this way, with respect to any point in the coordinate system ∀(x,y), the limited area meets the following conditions.

limited area=∀(x,y), $(P_{RA} \rangle P_{R0}) \cap (P_{RB0} \rangle P_{R0}) \cap (P_{RB1} \rangle P_{R0}) \ldots$
boundary point of limited area=(x,y) in cases where $(P_{RA}=P_{R0}) \cap (P_{RB0}=P_{R0}) \cap (P_{RB1}=P_{R0}) \ldots$.

where, $P_{RA}$ is the power of the infrared receiver that is received from the transmitter A, $P_{RBn}$ is the power of the infrared receiver that received from the transmitter B($B_n$), $\vec{\gamma}_n$ is a direction vector of the transmitter B in the corresponding coordinate system, $\vec{\gamma}$ is a direction vector of the transmitter A in the corresponding coordinate system, and (x, y) is a coordinate of the receiver in the corresponding coordinate system.

In this way, the boundary of the limited area can be obtained by connection boundary points (or by coordinates between a transmission node and the infrared transmitters A and Bn).

It should be noted that as an example, the infrared signal emitted by the infrared transmitter is used in the construction of the limited area of the transmitting device according to the embodiment of the present invention, however the wireless signals for building the limited area are not limited to the infrared signals, but may be other types of the wireless signals.

In the transmitting device according to the embodiment of the present invention, in order to build the secure wireless communication network, the cryptography key is embedded in the wireless signal transmitted by the transmitter. Here, the cryptography key may be generated by circuits and a MCU (Microcontroller Unit) at the same time. In the cryptography key generating unit according to the embodiment of the present invention, preferably, a random cryptography key is generated, and the random cryptography key is generated from a real random noise or other sensors so as to obtain a real-time random code.

Figure 5:
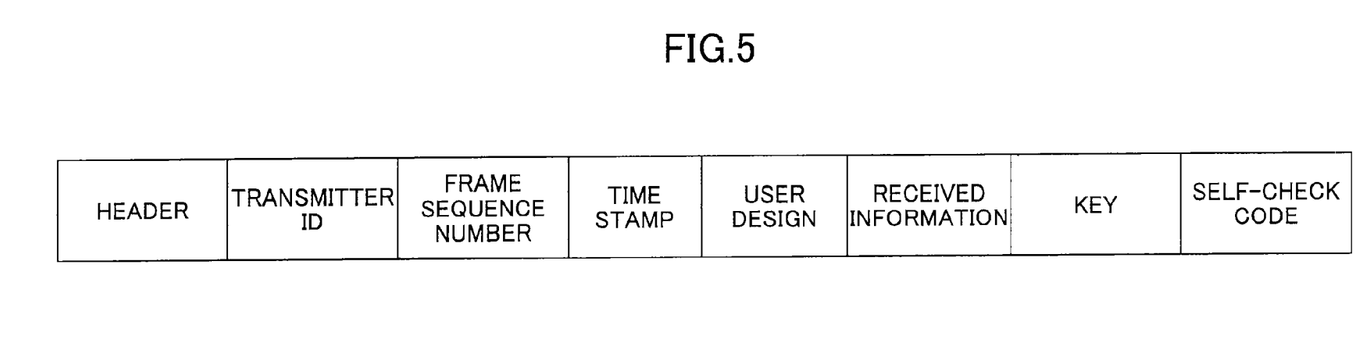
FIG. 5 is a schematic drawing illustrating the format of the cryptography key frame of the transmitting device according to the embodiment of the present invention.

After the cryptography key having a form of the random code is generated, the cryptography key encoding unit encodes the obtained cryptography key to the cryptography key frame. Specifically, a frame format of the cryptography key frame transmitted by the wireless signals is defined, so as to package the cryptography key having the form of the random code to a frame that can be transmitted by the wireless signals. FIG. 5 is a schematic drawing illustrating the format of the cryptography key frame of the transmitting device according to the embodiment of the present invention. As illustrated in FIG. 5, the cryptography key frame is composed of the following components.

A header: for identifying the beginning of a complete frame;

a Transmitter ID (Emitter ID): unit number of the transmitters;

a Frame Sequence Number (Frame Seq. No.): for transmitting the sequence number of the frame after the transmitter is restarted;

a Time Stamp: a information relating to the time, for sequence adjustment and cryptography key scheduling matching, etc.;

a User Design: a customizable transmitting content;

a Received Information (Received Info.): information received by a built-in infrared receiver or sensor of the transmitter;

a Key: the above random cryptography key;

a Self-Check Code: a check code for checking the integrity and the correctness of frame transmissions.

And then, the cryptography key scheduling unit schedules the cryptography key generated by the cryptography key encoding unit. Here, scheduling means a method of transmitting the wireless signals including the cryptography key by specific channel and time frequency. For example, in the transmitting system according to the embodiment of the present invention, the transmitters transmit the wireless code in broadcast mode of a low frequency such as 2 Hz, the bit rate of data transmission is approximately 1200, those may be determined according to a specific transceiver. Moreover, the cryptography key scheduling unit may control the generating and encoding of the cryptography key, namely, may be configured to generate a new cryptography key (in real-time) immediately after a cryptography key was transmitted. In this way, according to the cryptography key scheduling unit, the transmitting device according to the embodiment of the present invention can transmit the wireless signals having the built-in cryptography key frame by the transmitter.

Additionally, each transmitter may be configured by the cryptography key scheduling unit to transmit the wireless signals including the cryptography key, in cases where the transmitting device according to the embodiment of the present invention has plural transmitters. That is to say, each transmitter may transmit the wireless signals including each unique cryptography key on different frequencies via different channels.

In the transmitting device according to the embodiment of the present invention, the wireless communication network of the limited area can be generated by an easy system device, therefore, a secure WLAN can be provided. Moreover, two or more transmitters transmit two or more independent cryptography keys in real-time via two or more channels; therefore, the interference between the transmitting signals can be reduced and overall security can be improved.

According to another aspect of the embodiment of the present invention, a receiving device for receiving the wireless signals transmitted by the above transmitting device so as to access the wireless communication network created by the wireless signals, is provided. The receiving device comprises: a receiver configured to receive the wireless signals; a cryptography key decoding unit configured to decode the cryptography key frame of the wireless signals so as to obtain the cryptography key; a sequence adjustment and synchronization unit configured to adjust a sequence of the obtained plural cryptography keys so as to synchronize the plural cryptography keys; an area cryptography key generating unit configured to generate an area cryptography key according to the synchronized plural cryptography keys; and a network access unit configured to access the wireless communication network based on the area cryptography key.

Figure 6:
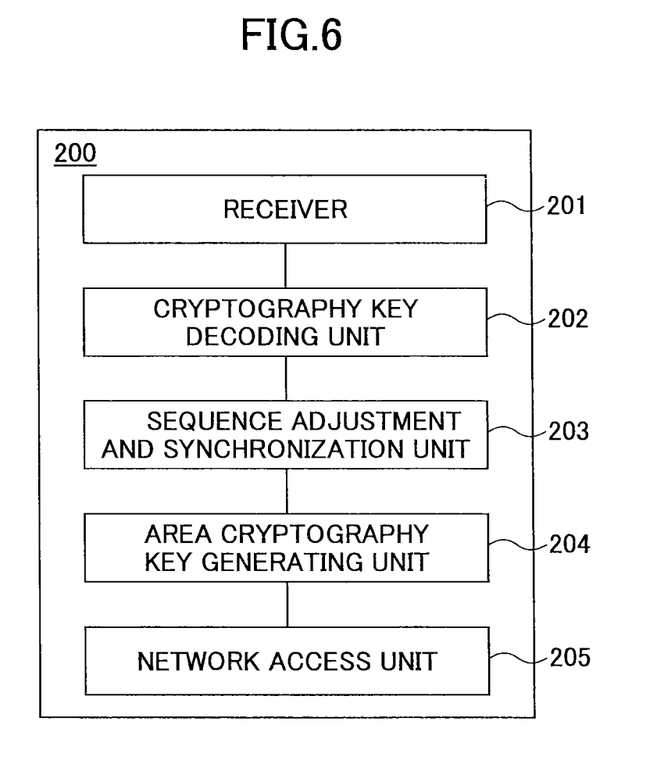
FIG. 6 a schematic drawing illustrating the receiving device of the embodiment of the present invention.

FIG. 6 a schematic drawing illustrating the receiving device of the embodiment of the present invention. As illustrated in FIG. 6, the receiving device 200 according to the embodiment of the present invention is provided to receive the wireless signals transmitted by the transmitting device 100 as illustrated in FIG. 2, so as to access the wireless communication network created by the wireless signals. The receiving device 200 comprises: a receiver 201 for receiving one or more wireless signals transmitted by one or more transmitters 101 of the transmitting device 100 as illustrated in FIG. 2; a cryptography key decoding unit 202 for decoding the cryptography key frame of the one or more wireless signals so as to obtain the cryptography key; a sequence adjustment and synchronization unit 203 for adjusting a sequence of plural cryptography keys obtained by the cryptography key decoding unit 202, so as to synchronize the plural cryptography keys; an area cryptography key generating unit 204 for generating an area cryptography key according to the plural cryptography keys obtained by the sequence adjustment and synchronization unit 203; and a network access unit 205 for accessing the wireless communication network based on the area cryptography key generated by the area cryptography key generating unit 204.

In the receiving device according to the embodiment of the present invention, if the receiving device is within the scope of the wireless communication network defined by the wireless signals transmitted by the transmitting device, the receiving device receives the wireless signals transmitted by the transmitting device. Similarly, only in the limited area, the receiving device can receive coding signals transmitted by the transmitters, decode cryptography keys to generate the area cryptography key, and access the wireless communication network by the area cryptography key.

In the receiving device according to the embodiment of the present invention, for reasons of security, it is necessary that the receiving device access the wireless communication network by the area cryptography key and the area cryptography key is generated from the cryptography key of the received wireless signal. The receiving device according to the embodiment of the present invention may receive the cryptography key from one transmitter of the transmitting device, and access the wireless communication network by the cryptography key directly. However, to improve the security of the wireless communication network, preferably, the receiving device generates area cryptography key based on received plural cryptography keys of plural transmitters and accesses the wireless communication network based on the area cryptography key. In this way, if the plural cryptography keys transmitted by the plural transmitters are real-time cryptography keys, it is necessary that the sequence adjustment and synchronization unit of the receiving device adjusts the sequence of the plural cryptography keys received in real-time, so as to synchronize the random codes of the plural cryptography keys. Additionally, the area cryptography key generating unit may generate the area cryptography key according to many algorithms, and the embodiment of the present invention is not limited to a specific algorithm.

The generated area cryptography key, for example, may be used in the IP layer (or network layer) of the wireless communication network. In this way, if the receiving device wants to join the wireless communication network, it is necessary to decode IP by the area cryptography key and add other necessary information of the network.

As described above, if the transmitting device according to the embodiment of the present invention adopts an infrared transmitter, the receiving device according to the embodiment of the present invention may also adopt an infrared receiver accordingly. The infrared transmitter and the infrared receiver have the advantage of low cost and good portability.

According to the receiving device of the embodiment of the present invention, the area cryptography key for accessing the wireless communication network of the created limited area is generated from the cryptography key carried by the wireless signals transmitted by the transmitting device according to the embodiment of the present invention. Therefore, it is possible to avoid access of the wireless communication network from an unauthorized receiving device, and the security of the created wireless communication network is improved significantly. Moreover, the area cryptography key is generated based on the cryptography keys of the wireless signals transmitted by the plural transmitters according to a specific algorithm; therefore, there is no leakage of information even if a transmitter or receiver is stolen or damaged.

According to another aspect of the present invention, a wireless communication system for creating a secure wireless communication network of a limited area is provided. The wireless communication system comprises a transmitting device and a receiving device. The transmitting device is configured to create the secure wireless communication network of the limited area, and comprises: one or more transmitters configured to transmit wireless signals, and create the limited area by a coverage scope of the wireless signals; a cryptography key generating unit configured to generate a cryptography key for the wireless signals; a cryptography key encoding unit configured to encode the cryptography key to a cryptography key frame; and a cryptography key scheduling unit configured to schedule the cryptography key frame so as to control the transmitter to transmit the wireless signals including the cryptography key frame. The receiving device is configured to receive the wireless signals transmitted by the transmitting device, so as to access the wireless communication network created by the wireless signals, and comprises: a receiver configured to receive the wireless signals; a cryptography key decoding unit configured to decode the cryptography key frame of the wireless signals so as to obtain the cryptography key; a sequence adjustment and synchronization unit configured to adjust a sequence of the obtained plural cryptography keys so as to synchronize the plural cryptography keys; an area cryptography key generating unit configured to generate an area cryptography key according to the synchronized plural cryptography keys; and a network access unit configured to access the wireless communication network based on the area cryptography key.

According to another aspect of the present invention, a method for controlling the wireless communication system that creates a secure wireless communication network of a limited area is provided. The method for controlling the wireless communication system comprises: a step of transmitting wireless signals, and creating the limited area by a coverage scope of the wireless signals; a step of generating a cryptography key for the wireless signals; a step of encoding the cryptography key to a cryptography key frame; a step of scheduling the cryptography key frame so as to control the transmitted wireless signals including the cryptography key frame; a step of receiving the wireless signals; a step of decoding the cryptography key frame of the wireless signals so as to obtain the cryptography key; a step of adjusting a sequence of the obtained plural cryptography keys so as to synchronize the plural cryptography keys; a step of generating an area cryptography key according to the synchronized plural cryptography keys; and a step of accessing the wireless communication network based on the area cryptography key.

Here, it should be noted that, in the wireless communication system and the control method thereof, if the transmitting device includes only one transmitter and transmits only one wireless signal, it is unnecessary for a receiving device to perform sequence adjustment and synchronization of the plural cryptography keys, and the receiving device may generate the area cryptography key from the obtained singular cryptography key according to another algorithm or make the obtained cryptography key as the area cryptography key directly. The embodiment of the present invention is not limited to those.

According to the wireless communication system and the method for controlling the wireless communication system, a secure wireless communication network of a limited area can be generated by an easy system configuration, therefore system cost and installation complexity can be reduced. Moreover, the coverage scope can be changed flexibly by adjusting the scope of the wireless signals transmitted by the transmitting device, therefore the convenience of using the wireless communication network is also improved significantly.

It should be noted that units and steps of the algorithm of the embodiments of illustrated in the present specification can be implemented by electronic hardware, computer software, or a combination of those two. To make the interchangeability of the hardware and software clear, the configuration and steps of the embodiments were generally described according to a function in the above description. The functions performed by hardware or software depends on the specific application and the design limit condition of the technical solution. The described functions may be realized by different methods based on each specific application without departing from the scope of the present invention.

It should be noted that the above described operation processes of system, device and unit may be referred for the corresponding process in the above method embodiment, and repeated explanations here are omitted for the sake of brevity.

It should be noted that the described system, device and method may be realized by other ways. For example, the above described device embodiment is just an example, the unit division is just a kind of logical function division. Another division method may be used in the actual implementation, for example, plural units or components may be combined or integrated into another system, or any features may be ignored or not performed. In addition, direct coupling, indirect coupling or communication links between the devices or units may use any interface and be an electrical method, a mechanical method or other methods.

Units described as a separate part may be separated physically or not. Parts illustrated as a unit may be a physical unit or not, namely, they may be located at one place, or be distributed in plural network units. Parts of units or all units may be selected according to the actual need so as to realize the object of the present invention.

Moreover, each of the function units according to the embodiments of the present invention may be integrated into one processing unit, or each unit may exist physically and individually, or two or more units may be integrated into one unit. The above integrated unit may be a hardware or a software function unit.

If the integrated unit is realized as a software function unit and is sold or used as an independent product, it may be stored in a computer readable medium. From this point, part or all of the technical solution of the present invention may be represented as a software product. The computer software product is stored in a storage medium, and including any commands for making a computer device (such as a personal computer, a server or a network device, etc.) perform all or parts of the steps of the method according to the embodiments of the present invention. The storage medium includes various medium that can store program codes such as flash memory, portable hard disk, ROM (Read-Only Memory), RAM (Random Access Memory), magnetic disk or optical disk.

The present invention is not limited to the specifically disclosed embodiments, and variations and modifications may be made without departing from the scope of the present invention.

The present application is based on Chinese Priority Application No. 201210195084.X filed on Jun. 13, 2012, the entire contents of which are hereby incorporated herein by reference.

What is claimed is:

1. A transmitting device for creating a secure wireless communication network of a limited area, comprising:
   one or more transmitters configured to transmit wireless signals, and create the limited area by a coverage scope of the wireless signals;
   a cryptography key generator configured to generate a cryptography key for the wireless signals;
   a cryptography key encoder configured to encode the cryptography key to a cryptography key frame; and
   a cryptography key scheduler configured to schedule the cryptography key frame so as to control the transmitter to transmit the wireless signals including the cryptography key frame to one or more nodes within the coverage scope of the wireless signals,
   wherein the wireless signals are infrared signals and a node is within the coverage scope of the wireless communication network where a receiving power of the node is greater than a threshold power.

2. The transmitting device according to claim 1, wherein the receiving power of the node is an actual receiving power of an infrared receiver at the node and a coverage scope of an infrared transmitter is limited according to the following equation 1:

$$P_R = \sigma \times \rho_{D_{(d)}} \times \sum_N P_{T_{(I)}} \rho_{Tr_{(\alpha_{Tr})}} \quad \text{equation 1}$$

where $\rho_{D_{(d)}}$ an attenuation coefficient of a distance, d is a distance to the transmitter, $$\rho_{Tr_{(\alpha_{Tr})}}$$

is an attenuation coefficient of a transmitting angle (against a centerline) of the transmitter, $\alpha_{Tr}$ is the transmitting angle (against the centerline) of the transmitter, $P_{T_{(I)}}$ is a relationship map between a transmitting power of one LED and the current, N is the number of infrared LEDs, $P_R$ is the actual receiving power of an infrared receiver at one node, and $\sigma$ is another parameter corresponding to one of an influence on the infrared transmission power from a transmission medium and an error of a non-use LED unit with respect to the infrared transmission power.

3. The transmitting device according to claim 1, wherein the coverage scope of two or more infrared transmitters is limited according to transmitting angles of each infrared transmitter ($\alpha$), transmitting distances of each infrared transmitter (d), transmitting powers of each infrared transmitter (I,Pt,Pr$_0$) and positions and orientations of each infrared transmitter (x,y, $\vec{\gamma}$ ).

4. The transmitting device according to claim 1, wherein the cryptography key generator is configured to generate the cryptography key according to a real random noise.

5. The transmitting device according to claim 1, wherein the cryptography key generator is configured to generate the cryptography key in real-time.

6. The transmitting device according to claim 1, wherein the cryptography key frame having a frame structure composed of a header, a transmitter ID, a frame sequence number, a time stamp, a user design, a received information, a key and a self-check code.

7. A receiving device for receiving the wireless signals transmitted by the transmitting device according to claim 1, so as to access the wireless communication network created by the wireless signals, comprising:
   a receiver configured to receive the wireless signals;
   a cryptography key decoder configured to decode the cryptography key frame of the wireless signals so as to obtain a plurality of cryptography keys;
   a sequence adjuster and synchronizer configured to adjust a sequence of the obtained plural cryptography keys so as to synchronize the plural cryptography keys;
   an area cryptography key generator configured to generate an area cryptography key according to the synchronized plural cryptography keys; and
   a network access controller configured to access the wireless communication network based on the area cryptography key.

8. A wireless communication system for creating a secure wireless communication network of a limited area, comprising:
   a transmitting device for creating the secure wireless communication network of the limited area, wherein the transmitting device comprises
      one or more transmitters configured to transmit wireless signals, and create the limited area by a coverage scope of the wireless signals;
      a cryptography key generator configured to generate a cryptography key for the wireless signals;
      a cryptography key encoder configured to encode the cryptography key to a cryptography key frame; and
      a cryptography key scheduler configured to schedule the cryptography key frame so as to control the transmitter to transmit the wireless signals including the cryptography key frame to one or more nodes within the coverage scope of the wireless signals,
      wherein the wireless signals are infrared signals and a node is within the coverage scope of the wireless communication network where a receiving power of the node is greater than a threshold power, and
   a receiving device for receiving the wireless signals transmitted by the transmitting device, so as to access the wireless communication network created by the wireless signals, wherein the receiving device comprises
      a receiver configured to receive the wireless signals;
      a cryptography key decoder configured to decode the cryptography key frame of the wireless signals so as to obtain a plurality of cryptography keys;
      a sequence adjuster and synchronizer configured to adjust a sequence of the obtained plural cryptography keys so as to synchronize the plural cryptography keys;
      an area cryptography key generator configured to generate an area cryptography key according to the synchronized plural cryptography keys; and
      a network access controller configured to access the wireless communication network based on the area cryptography key.

9. A method for controlling the wireless communication system for creating a secure wireless communication network of a limited area, comprising:
   a step of transmitting wireless signals, and creating the limited area by a coverage scope of the wireless signals;
   a step of generating a cryptography key for the wireless signals;
   a step of encoding the cryptography key to a cryptography key frame;
   a step of scheduling the cryptography key frame so as to control the transmitted wireless signals including the cryptography key frame to be transmitted to one or more nodes within the coverage scope of the wireless signals, wherein the wireless signals are infrared signals and a node is within the coverage scope of the wireless communication network where a receiving power of the node is greater than a threshold power;
   a step of receiving the wireless signals;
   a step of decoding the cryptography key frame of the wireless signals so as to obtain a plurality of cryptography keys;
   a step of adjusting a sequence of the obtained plural cryptography keys so as to synchronize the plural cryptography keys;
   a step of generating an area cryptography key according to the synchronized plural cryptography keys; and
   a step of accessing the wireless communication network based on the area cryptography key.

10. The transmitting device according to claim 1, wherein the coverage scope of two or more infrared transmitters is limited according to at least transmitting angles of each infrared transmitter ($\alpha$).

11. The transmitting device according to claim 1, wherein the coverage scope of two or more infrared transmitters is limited according to at least transmitting distances of each infrared transmitter (d).

12. The transmitting device according to claim 1, wherein the coverage scope of two or more infrared transmitters is limited according to at least transmitting powers of each infrared transmitter ($I, Pt, Pr_0$).

13. The transmitting device according to claim 1, wherein the coverage scope of two or more infrared transmitters is limited according to at least positions and orientations of each infrared transmitter ($x, y, \vec{\gamma}$).

* * * * *